United States Patent [19]
Freestone

[11] 3,943,560
[45] Mar. 9, 1976

[54] PICTURE LEVEL CONTROL WITH COMPATIBLE AUTOMATIC CHROMA CONTROL

[75] Inventor: Harry T. Freestone, Portsmouth, Va.

[73] Assignee: General Electric Company, Portsmouth, Va.

[22] Filed: May 10, 1974

[21] Appl. No.: 468,991

[52] U.S. Cl.................................. 358/27; 358/40
[51] Int. Cl.².......................................... H04N 9/535
[58] Field of Search........................ 358/27, 39, 40

[56] References Cited
UNITED STATES PATENTS

| | | | |
|---|---|---|---|
| 2,908,748 | 10/1959 | Macovski | 358/27 |
| 2,913,519 | 11/1959 | Macovski et al. | 358/27 |
| 2,921,122 | 1/1960 | Macovski | 358/27 |
| 3,342,930 | 9/1967 | Kool | 358/27 |

*Primary Examiner*—George H. Libman

[57] ABSTRACT

A picture level control for a color television receiver which simultaneously varies luminance and chrominance signal levels and additionally provides a compensating voltage to prevent automatic color controls from counteracting the intended chrominance variation. The compensating voltage may be used either to control the feedback amplifier in the color burst automatic gain control (AGC) circuit or used to achieve the same result by controlling the gain of the subcarrier oscillator generator when such oscillator is of the type to form part of the burst AGC circuit. In addition, the compensating voltage is applied to the chroma averaging AGC circuit when such is included in the receiver to prevent the chroma averaging circuit from counteracting intended picture level variation. The picture control may be positioned in the receiver to control the composite video signal before the chrominance and luminance information are separated or after separation to respectively control the luminance and chrominance information.

7 Claims, 6 Drawing Figures

PICTURE LEVEL CONTROL WITH COMPATIBLE AUTOMATIC CHROMA CONTROL

BACKGROUND OF THE INVENTION

This invention relates to improved circuitry for color television receivers and more particularly to a picture level control circuit including compatible automatic chroma control for such receivers.

Color television receivers of the prior art are generally equipped with manual controls allowing individual adjustment of luminance (contrast), chrominance (color saturation), tint, brightness and various other functions of the receivers. These controls due to their number and interrelationship, have tended to make color television receiver adjustment both complex and time consuming. It is desirable to eliminate such complex adjustment of color television receivers and accordingly single knob picture controls have been designed. Such controls may ideally be preadjusted in the factory to set the ratio between chrominance and luminance. However, since factory settings do not always correspond to viewer preference controls are set to provide the desired ratio between chrominance and luminance and then the single picture control may be used to simultaneously adjust luminance and chrominance.

The picture control can be placed in a color television either prior to the separation of the video signal into chrominance and luminance components or after such separation. It is desirable to place the picture control prior to the separation of the video since here no problem of chroma tracking luminance is encountered. However, such placement exposes the adjustment of the video level to automatic chroma level compensating circuits in succeeding stages. Such compensating circuits comprise the color burst automatic gain control circuit and the chroma averaging automatic gain control circuit, which circuits would ordinarily treat any changes in chroma level brought about by the picture control or any other source as unwanted changes in chroma level and compensate to keep the chroma level constant.

If the picture level control is placed in the receiver subsequent to the separation of the video signal into its luminance and chrominance components, it is possible to avoid the reach of these automatic compensating circuits and their chroma level change defeating action. However, such an approach requires incorporating much additional circuitry. Accordingly, in order to utilize existing circuitry, the present invention contemplates placement of the picture control circuit either prior to the color burst AGC circuit where composite video signal level is controlled or prior to the chroma averaging AGC circuit where separate luminance and chrominance signals are simultaneously controlled. In both configurations, the picture control circuit works in conjunction with existing circuitry including the AGC circuits to allow picture level adjustment.

OBJECTS OF THE INVENTION

It is accordingly an object of the present invention to provide an improved picture level control circuit.

Another object of the present invention is to provide a picture level control circuit which compensates automatic chroma level control circuits from overriding adjustment of the chrominance portion of the video signal.

A further object of the present invention is to provide a picture level control circuit which adjusts received video signal amplitude and automatic color control circuit simultaneously to prevent picture level control override.

It is a still further object of the present invention to provide a picture level control circuit which separately adjusts luminance and chrominance signal amplitude in a predetermined ratio and provides automatic color control compensation to prevent picture level control override.

SUMMARY OF THE INVENTION

The foregoing and other objects are achieved by the present invention in the form of a new and improved picture level control circuit which provides a voltage proportional to the picture level setting to offset automatic color control operation. In one embodiment the offsetting voltage is applied to an error amplifier in the color burst AGC circuit to adjust the DC bias to the amplifier to maintain automatic color control error unchanged with changes in picture level setting. In a second embodiment, the offsetting voltage is applied to the subcarrier oscillator-amplifier in the color burst AGC circuit to adjust the AC gain of the amplifier to maintain subcarrier amplitude constant with picture level setting. The offsetting voltage is also applied to counteract the chroma averaging AGC circuit if such circuit is included in the receiver. In a third embodiment where the picture level control is placed after separation of the luminance and chrominance signals, the offsetting voltage need only be applied to the chrominance aveaging AGC circuit to override the tendency of this chrominance feedback control circuit to attenuate changes in the chrominance signal level.

It is to be noted that each of the embodiments of the present invention employs only that amount of correction necessary to render the AGC circuits non-responsive only to picture level control adjustments. Thus, even during picture control adjustment the AGC circuits are capable of responding to other causes of chroma level change to compensate for such changes.

The present invention also utilizes a unique, simplified video amplifier which provides picture level control of constant ratio for separation luminance and chrominance components and simultaneous generation of a proportional DC reference voltage to overcome chroma level control circuit compensation.

BRIEF DESCRIPTION OF THE DRAWINGS

The objects and features of the invention will be more readily understood from the following detailed description taken in conjunction with the following drawings, in which.

DETAILED DESCRIPTION

Figure 1:
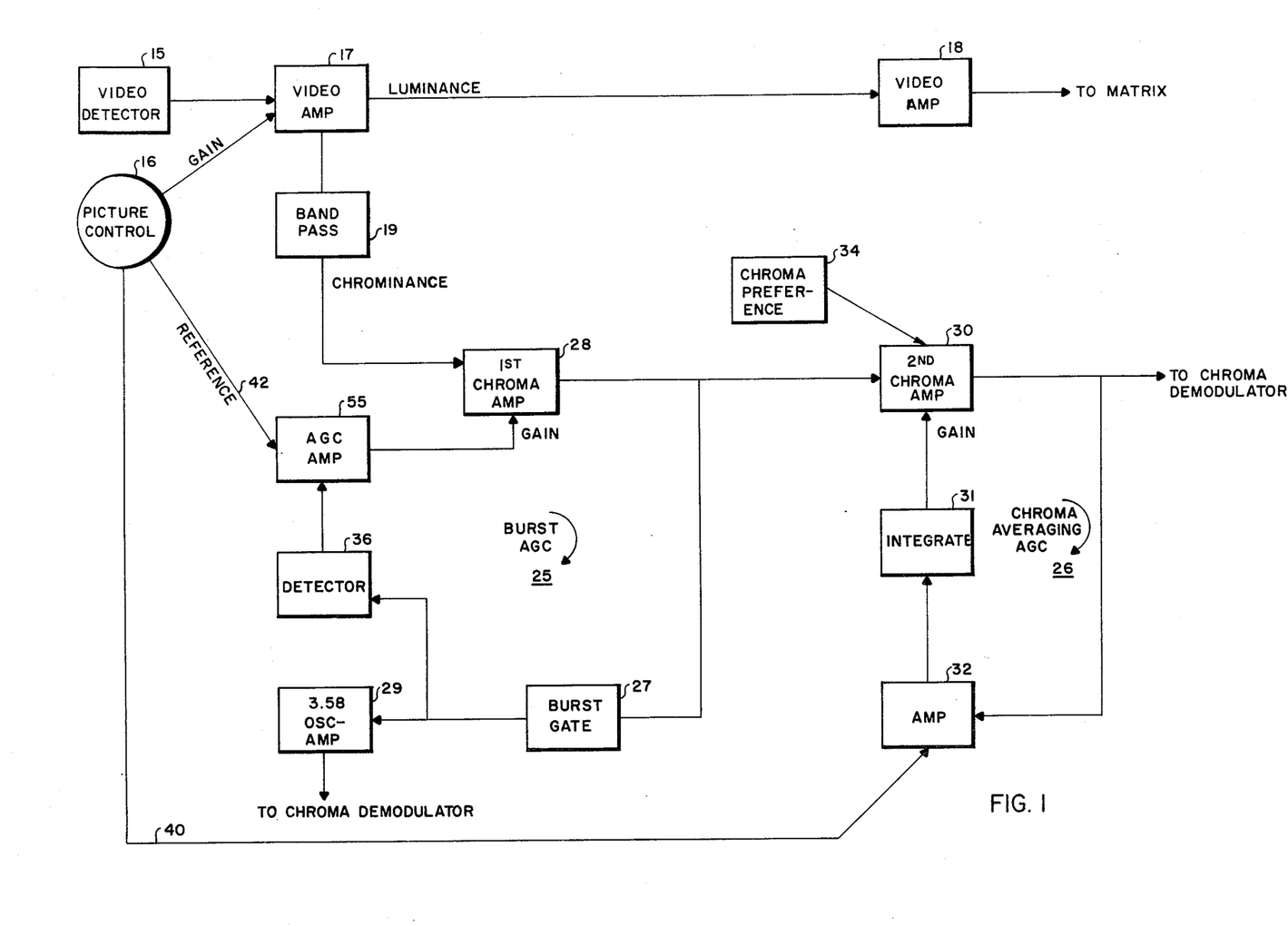
FIG. 1 is a block diagram of one embodiment of the present invention showing picture control of the video signal prior to separation and of the luminance and chrominance signals.

Referring now to FIG. 1 there is shown a first embodiment of the picture control circuit according to the present invention. In the upper left hand of this Figure a video detector 15 is shown applying a composite video signal to video amplifier 17. The gain of the video amplifier is shown being controlled by a single control device, picture control 16. The video amplifier 17 is shown having two outputs, a luminance output applied to video amplifier 18 and a chrominance output applied to first chroma amplifier 28 by means of bandpass filter circuit 19. The luminance signal is amplified by video amplifier 18 and applied to the cathode ray tube directly or by means of a matrix circuit where it is first combined with the demodulated chrominance signal.

Chroma amplifier 28 is shown as an adjustable gain amplifier and forms part of an automatic gain control circuit in which the color burst portion of the chroma signal is maintained at constant amplitude as a means of overcoming changes in the level of the chroma signal such as would be occasioned by channel switching and tuning or other factors tending to change the level of the chroma signal. The burst automatic gain control circuit 25 comprises burst gate 27 which passes only the burst portion of the chroma signal, detector 36, the output of which is fed to amplifier 55, which controls the gain of the first chroma amplifier 28. Amplifier 55 is shown having a reference control input from the picture control circuit. This input is a DC voltage generated by the picture control in proportion to the adjustment of the level of the video signal so that the tendency of the burst AGC circuit to compensate for chrominance change occasioned by the picture control is overcome by this DC control voltage.

The burst gate 27 output is also applied to subcarrier oscillatoramplifier 29, which is a local generator for regenerating the chrominance subcarrier and is shown outputting a 3.58 MH$_z$ subcarrier to a chroma demodulator (not shown).

FIG. 1 also shows a chroma averaging circuit in a second automatic gain control circuit and the interaction of this circuit with the picture control 16 in accordance with the present invention. The output of the first chroma amplifier 28 is supplied to a second chroma amplifier 30, a gain controlled amplifier much like amplifier 28. Amplifier 30 is shown having its gain controlled by a chroma preference control 34. This control may be a viewer operated control serving to adjust the ratio between the chrominance and luminance of the picture in accordance with the preference of the viewer. The output of second chroma amplifier 30 is designated as being supplied to the chroma demodulator in the receiver and also be amplifier 32 in the chroma averaging automatic gain control circuit 26. The output of amplifier 32 is integrated by the integrator 31 and applied to control the gain of the second chroma amplifier 30. It is noted amplifier 32 is in turn controlled by the picture control 16 via line 40 in much the same fashion as amplifier 55 in the burst AGC circuit is controlled by the DC reference voltage.

In summary, the embodiment of FIG. 1 illustrates the employment of a picture control circuit operating directly on the video amplifier prior to the time the luminance and chrominance signals are separated and applying a DC control voltage to the various automatic chroma level control circuits to be found in a color television receiver.

Figure 2:
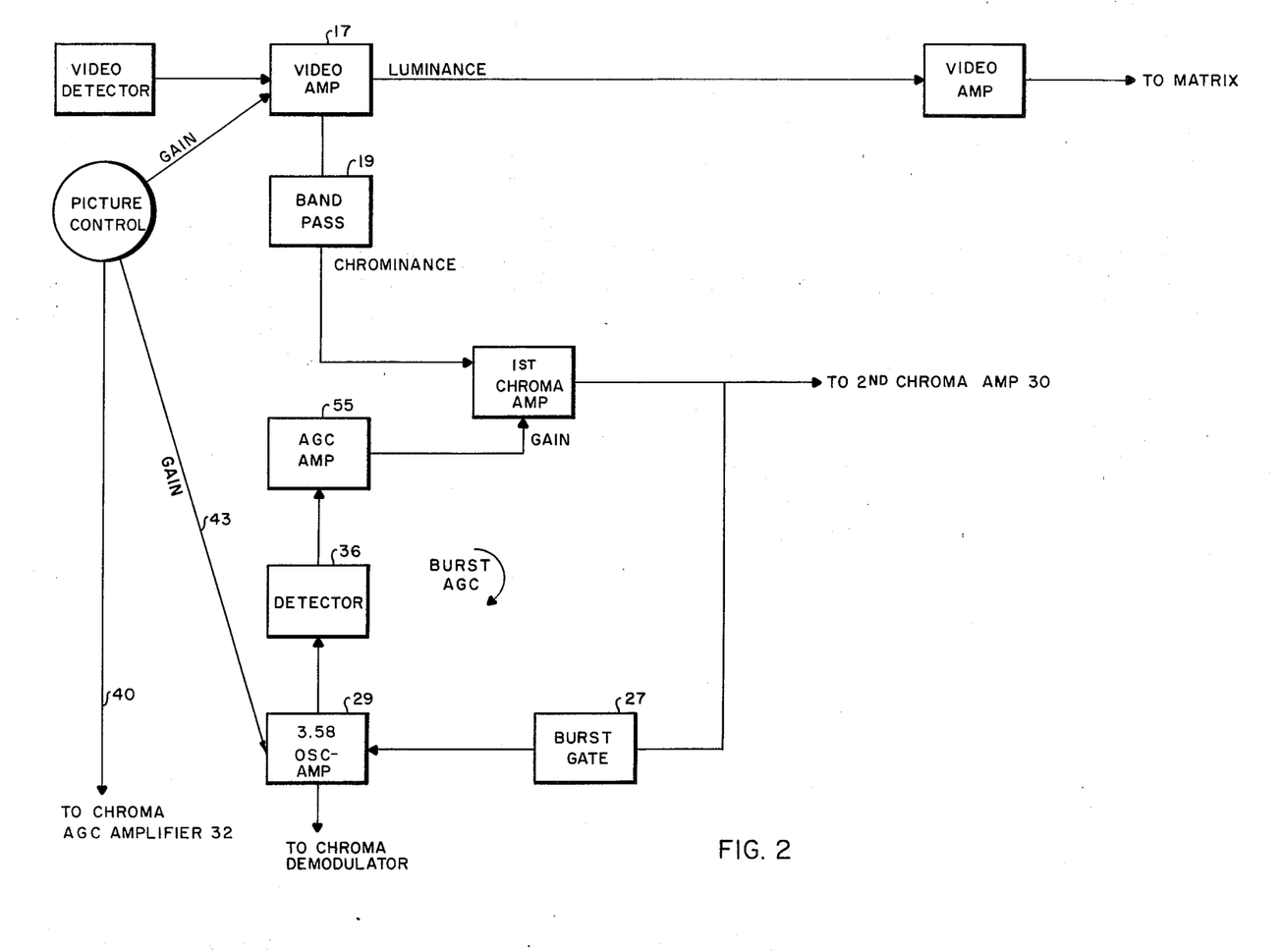
FIG. 2 is a block diagram of another embodiment of the present invention showing picture control of the video signal prior to separation of the luminance and chrominance signals.

The embodiment of FIG. 2 is substantially identical to the embodiment of FIG. 1 with the exception that the oscillator-amplifier for regenerating the subcarrier is of the type whose output level is dependent upon the level of the input burst signal. In such a circuit it is customary for the subcarrier oscillator to form a part of the burst AGC loop and in the embodiment of FIG. 2 the picture control DC offset voltage is shown being applied to the 3.58 MH$_z$ oscillator-amplifier 29 instead of to amplifier 55. In all other respects the circuit of FIG. 2 is identical to the circuit of FIG. 1.

It should be recognized that the embodiments of FIGS. 1 and 2 are complete without the employment of the chroma averaging circuit and that the chroma averaging circuit is only shown to illustrate how such a circuit is incorporated into the present invention. It should also be noted in conjunction with FIGS. 1 and 2 that even with the oscillator of FIG. 2 of the type whose output is dependent upon the level of the burst and therefore included within the burst AGC loop, it is possible to control this loop by means of amplifier 55 as is shown in FIG. 1. However, it is preferable to control the oscillator 29 directly in order to maintain the subcarrier output that is applied to the chroma demodulator constant for proper chroma demodulation.

The use of chroma averaging circuits in television receivers is of relatively recent occurrence. One purpose of such circuits is to compensate for the inadequency of the burst AGC circuit in the first instance to maintain the chroma level constant under all circumstances. The assumption that is made in utilizing a burst AGC circuit is that the ratio between burst and chroma is always constant. The ratio between burst and chroma can be different when the receiver is switched from one broadcast channel to the next. Accordingly, control of burst is not always conceptually correct to control chrominance level and because of this it has been helpful to employ a circuit such as the chroma averaging circuit to attenuate burst to chroma level variations.

Figure 3:
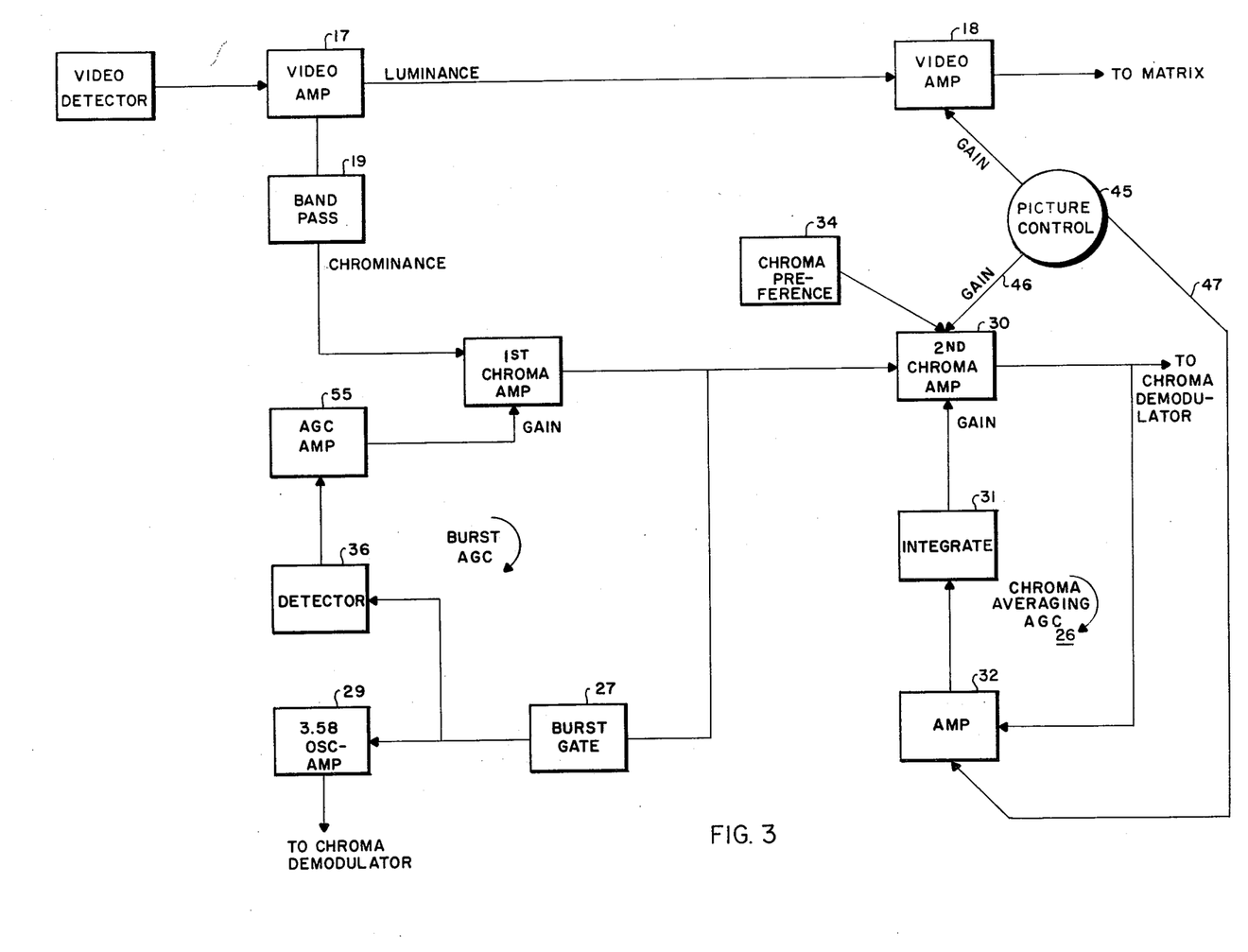
FIG. 3 is a block diagram of an embodiment of the present invention showing picture control of the separated luminance and chrominance signals.

The embodiment of FIG. 3 shows the picture control being placed in the receiver after the chrominance and luminance signals have been separated. Picture control 45 is shown controlling the gain of video amplifier 18 and the gain of the second chroma amplifier 30. Where there is a chroma averaging circuit contained in the receiver, such as indicated in FIG. 3, the picture control must, in accordance with the present invention, control the chroma averaging automatic gain control loop 26 in order to offset the tendency of this circuit to override the picture control level adjustment. Thus, as shown in FIG. 3, picture control 45 adjusts the gain of chroma amplifier 30 and applies a voltage to amplifier 32 to offset the tendency of the AGC circuit to attenuate the intended chroma level change.

Figure 4:
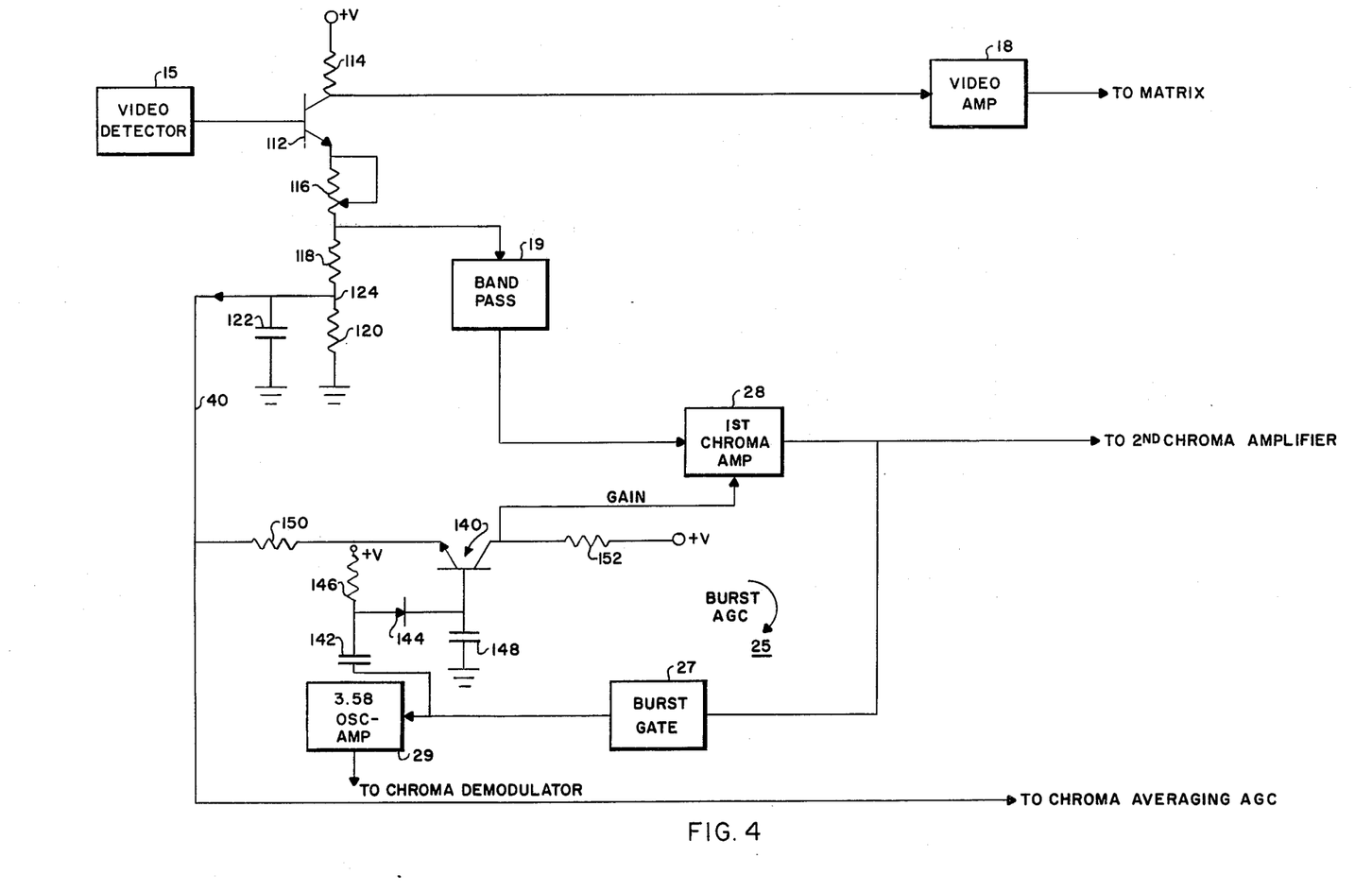
FIG. 4 is a partial block and partial circuit diagram showing the details of the embodiment of FIG. 1.

Referring now to FIG. 4, the video signal derived by the video detector is shown being applied to the base terminal of a transistor 112 which acts as a variable gain video amplifier. The collector terminal of transistor 112, which forms the luminance channel output, is connected through a load resistor 114 to a supply voltage source +V. The emitter terminal of transistor 112 is connected to ground through the series combination of a potentiometer 116, a resistor 118 and a resistor 120. The variable tap on potentiometer 116 is also connected to the emitter terminal of transistor 112. A capacitor 122 is connected to parallel with resistor 120 and has a value such that the video signals processed by transistor 112 are shunted around resistor 120 to cause the voltage at junction 124, mediate resistors 118 and 120, to remain at a substantially constant DC value in the absence of adjustment of potentiometer 116.

The video amplifier just described is uniquely simple. A single potentiometer 116 controls the amplitude of the luminance signal output in the collector, the chrominance signal outputted between potentiometer 116 and resistor 118 and a DC voltage obtained at junction 124. While the chrominance signal could also have been outputted at the collector, the present arrangement allows for differing gain to be applied to the luminance and chrominance signals. Although the gains are different, analysis of the circuit shows that the luminance to chrominance ratio remains constant as potentiometer 116 is adjusted. The luminance output voltage from transistor 112 is determined by the following ratio of resistors, 114/(116 + 118). This is the ratio of collector to emitter resistors. Resistor 120 does not affect the AC luminance and chrominance signals due to bypass capacitor 122. The chrominance voltage output is determined by the ratio of emitter resistors, namely 118/(116 + 118). It thus can be seen that the ratio of luminance to chrominance is 114/118, a ratio that is constant with changes in the value of potentiometer 116.

Although resistor 120 is out of the AC circuit, it is in the DC circuit of the video amplifier and the voltage thereacross is directly affected by the setting of potentiometer 116. Accordingly, an increase in the adjustment of video drive (increase in chrominance and luminance) will proportionately increase the DC voltage appearing across resistor 120. In this embodiment, in order that the DC voltage mediate resistors 118 and 120 only be a function of the setting of potentiometer 116 and not the content or duty cycle of the video signal, it should be understood that the coupling of the video signal to the base of transistor 112 is necessarily constrained to A.C. coupling.

The video signal developed at the junction mediate resistors 116 and 118 is connected by means of bandpass filter 19 to first chroma amplifier 28 forming a part of the chrominance channel.

The chrominance signal at the output of amplifier 28 is indicated as being applied to a second chroma amplifier where it is subsequently supplied to a chroma demodulator. This signal output of amplifier 28 is also applied to burst gate 27. This gate, as is well known in the art, is gated on during the back porch portion of the chroma signal so that only the color burst signal is allowed to pass. The burst signal is supplied both to the chroma subcarrier generator 29 and to an amplitude detector circuit as will be described. The subcarrier generator is a 3.58 MH$_z$ oscillator of a type well known in the art in which the amplitude of the subcarrier output is independent of the burst amplitude. This output is indicated as being supplied to the chroma demodulator (not shown).

The burst signal is also applied to a peak detector comprising capacitor 142, resistor 146, diode 144 and capacitor 148. This peak detector, one of a variety of amplitude detectors that can be used, is sensitive to changes in level of the burst signal and as such forms part of a gain control loop to control the gain of the chroma amplifier 28. The diode 144 of the peak detector conducts on the positive peaks of the burst signal to supply storage capacitor 148 with a voltage that is proportional to the peak amplitude of the burst signal.

The amplifier 55 of FIG. 1 is shown in FIG. 4 as comprising transistor 140 having collector resistor 152 connected to voltage supply +V, emitter resistor 150 connected to a source of reference potential and its base terminal connected to respond to the voltage stored by capacitor 148. As such, capacitor 140 is a standard gain controlled amplifier supplying an amplified output of the voltage stored by capacitor 148 to the gain control input of chroma amplifier 28. By means of the polarity shift through amplifier 140, increase in the burst level will be amplified and applied to amplifier 28 to reduce the output level of this amplifier to maintain chrominance signal level constant.

If the emitter resistor 150 of amplifier 140 were reference to ground potential, as is common, any attempted changes in chroma level taking place in the television receiver prior to amplifier 28 would be nullified by this burst AGC circuit. However, in accordance with the present invention, it is desired that changes in the chroma level due to picture control adjustment are not nullified. To accomplish this, the reference voltage for transistor 140 is therefore taken from point 124 in the video amplifier. Thus, when the picture control is adjusted to increase the video level, the voltage at the emitter of transistor 140 is raised to change the bias reference voltage of this transistor. In this manner, although the amplitude of the burst signal is altered by adjusting of the picture control potentiometer 116, a compensating change is made to the emitter bias of transistor 140 to maintain the collector-emitter current through this transistor constant. The AGC loop is thus rendered non-responsive to chroma level shifts occasioned by picture control adjustment while the AGC circuit remains sensitive to all other variations in chroma level.

Figure 5:
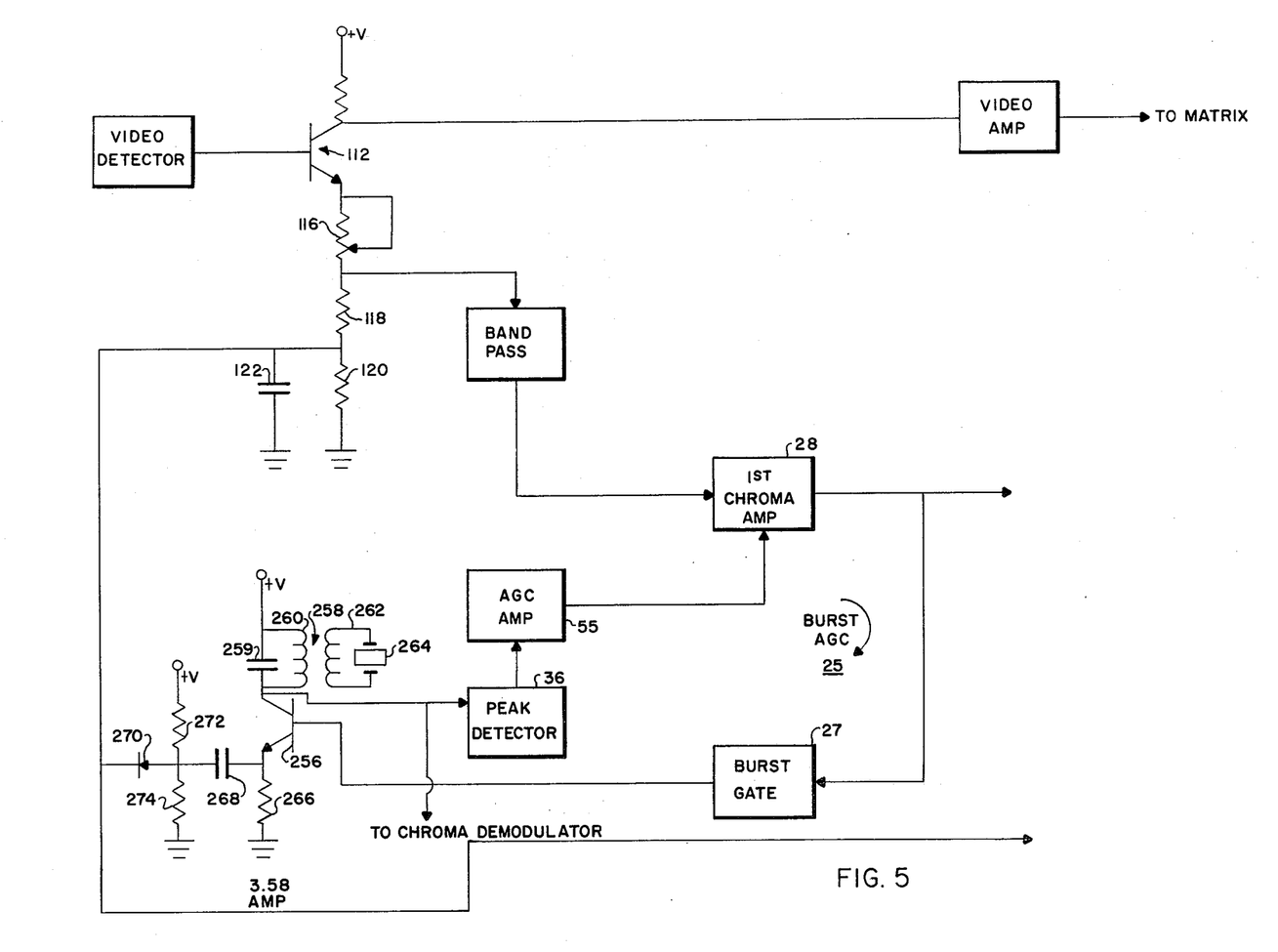
FIG. 5 is a partial block and partial circuit diagram showing the details of the embodiment of FIG. 2.

Referring now to FIG. 5, where like components to the other drawings are designated with like reference numerals, there is shown an alternative embodiment corresponding to the block diagram of FIG. 2 in which the 3.58 MH$_z$ subcarrier generator forms part of the burst AGC circuit. Here the subcarrier generator is of the type in which the output level is dependent upon the input level of the color burst signal, such as the ringing oscillator shown, and thus can be contained in the AGC circuit.

In FIG. 5 the output from the burst gate 27 is applied directly to the base of transistor 256 which forms the amplifier portion of amplifier-oscillator 29 (FIG. 2). The amplifier color burst signal is applied to transformer 258 connected by its primary winding 260 in the collector circuit of transistor 256. Capacitor 259 in parallel with primary winding 260 are both connected to the supply voltage +V and as such comprise the collector load of transistor 256. The secondary winding 262 of the transformer contains a crystal oscillator 264. The effect of applying the amplifier burst signal to the transformer 258 is to lock the frequency and phase of the oscillator in a known manner. The output of amplifier 256 is applied to the peak detector and also to the chroma demodulator (not shown) as indicated.

The emitter terminal of transistor 256 is connected by a resistor 266 to ground and in parallel with this DC path to ground is an AC path comprising capacitor 268 and diode 270 in series with video amplifier emitter capacitor 122 coupled to ground. The resistors 272 and 274 form a bias circuit between a positive voltage supply +V and ground for the diode 270. The cathode of the diode 270 is connected to the reference voltage derived from the picture control circuit at point 124 between the junction of resistors 118 and 120. The diode 270 acts as a variable resistance, the resistance depending upon the voltage across this device. For example, if the picture control is adjusted to reduce the video drive, the DC voltage at point 124 is accordingly lowered and the diode 270 will conduct harder lowering the resistance of diode 270 in the emitter of transistor 256 thereby increasing the gain of this transistor to offset the tendency of the burst AGC circuit to compensate for the lowered chroma level appearing at the output of first chroma amplifier 28. The diode bias resistors 272 and 274, as well as resistors 120 and 266 are adjusted to properly offset the corrective gain in the compensating AGC circuit. Note that although burst level is changed by the picture level potentiometer, the subcarrier output, which in the type circuit shown ordinarily would have changed also, now remains constant, a condition desirable for proper color demodulation.

Chroma level compensation by use of the burst signal, such as in burst AGC circuit 25, is based upon the assumption that controlling burst level is tantamount to controlling the chroma level. This assumes that the relationship of burst to chroma is constant. It has been found, however, that the relationship of burst level to chroma level may change between television channels and also even sometimes between the cameras used in photographing the scene being televised. Accordingly, television receivers recently have been designed to include a chroma averaging circuit which is used to attenuate overt changes in the average chroma level. The block diagrams shown in FIGS. 1 and 2 have indicated how the picture controls there shown would operate to compensate for the tendency of this second automatic chroma control circuit to upset chrominance/luminance tracking with picture control setting. The circuit of FIG. 6 shows like the block diagram of FIG. 3 placement of a picture control in the receiver after the chrominance and luminance portions of the video signals have been separated and the relationship of such a picture control to a chroma averaging AGC circuit.

Figure 6:
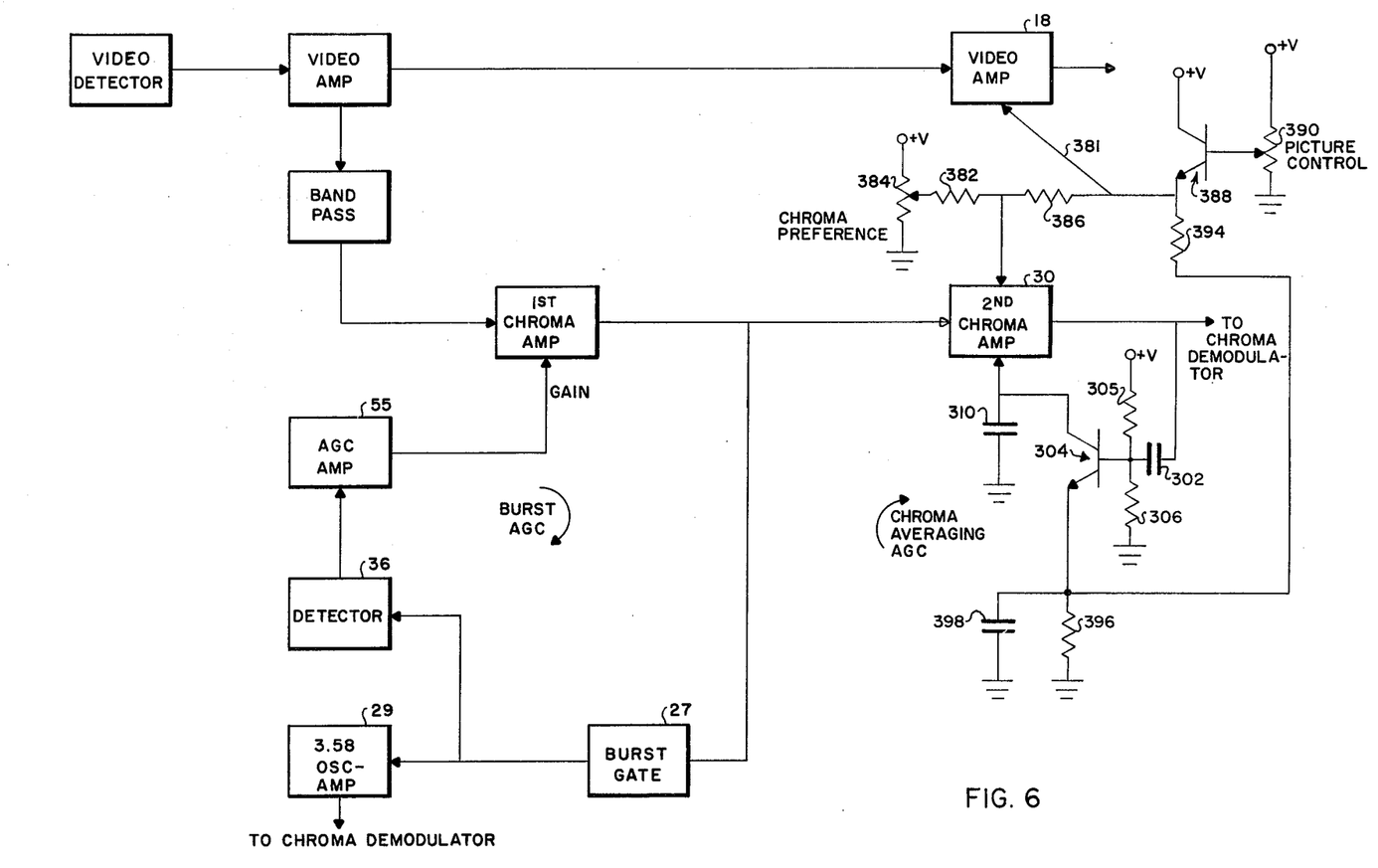
FIG. 6 is a partial block and partial circuit diagram showing the details of the embodiment of FIG. 3.

Referring now to FIG. 6 there is shown a picture control circuit comprising a potentiometer 390 connected at its variable terminal to the base electrode of transistor 388 and at its fixed terminals between a source of positive voltage +V and ground. The collector of transistor 388 is directly connected to the source of positive voltage +V, this transistor thereby serving as an emitter follower, so that the voltage appearing at the base less the emitter-base diode voltage drop appears at the emitter electrode thereof. This voltage is applied by means of lead 381 to control the gain of video amplifier 18 to adjust the luminance portion of the video signal. This same voltage is applied by means of resistor 386 and lead 380 to the second chroma amplifier 30 to adjust the chroma portion of the video signal and by means of resistor 394 to override the compensating effect of the chroma averaging AGC circuit 26.

FIG. 6 shows that the chroma portion of the video signal may also be adjusted by means of a potentiometer 384 connected between a source of positive voltage +V and ground. This potentiometer and coupling resistor 382 provide a chroma preference control. This enables the viewer to establish the desired ratio between luminance and chrominance and when the picture control is adjusted this desired ratio will be maintained.

The chroma averaging AGC circuit is designed to attenuate rather than nullify average chroma excursions and hence does not render the chroma preference control nugatory. The circuit function is sufficient, however, to upset chrominance/luminance tracking and hence the need for the AGC circuit override when the picture control is adjusted.

A chroma averaging circuit is shown in FIG. 6 to comprise a transistor 304 having its base circuit connected to respond to the chroma signal at the output of second chroma amplifier 30 by means of coupling capacitor 302. The bias circuit for the base terminal of this transistor is provided by series resistors 305 and 306 connected between a source of positive voltage and ground. The emitter of transistor 304 is connected to ground by means of resistor 396 and capacitor 398 is parallel therewith. It is noted that the DC reference current for the emitter may be varied by the compensating current applied through resistor 394 from the emitter of the picture control transistor 388. The collector of transistor 304 is connected to second chroma amplifier 30 and also is connected to ground through a capacitor 310 so that the AC voltage applied to the base of transistor 304 is averaged by the collector capacitor 310 and this average voltage is applied to control the gain of chroma amplifier 30. It can be seen that by proper proportioning of the resistors 394, 396, 305, 306 and 386 that adjustment of picture control potentiometer 390 to occasion a change of the chroma level at the output of amplifier 30 will also result in a neutralizing effect on the chroma averaging circuit so that the chroma level is changed as desired without being compensated by the chroma averaging AGC circuit.

It can be seen that the invention described above operates to provide a single picture level control for adjusting luminance and chrominance gain in a predetermined ratio in a color television receiver in which automatic gain control circuits are used to compensate for variations in chroma signal level and that the picture control circuit neutralizes such compensating circuits in order for the ratio of chrominance to luminance to be maintained constant throughout the range of picture control adjustment. It would be apparent to those skilled in the art that various modifications and changes may be made in the circuitry herein described, and it is intended that the foregoing description be taken as an example and not in limitation of the invention which is intended to be determined only by the scope of the appended claims.

What is claimed and desired to be secured by Letters Patent of the United States is:

1. In a color television receiver having a luminance signal channel and a chrominance signal channel containing feedback control means to maintain the chrominance signal level constant, a picture control circuit comprising:

adjusting means for adjusting the level of said luminance and chrominance signals and generating a reference voltage proportional to the level change in the chrominance signal caused by said adjusting means, said feedback control means being responsive to level changes in said chrominance signal to develop a correcting voltage to offset said level changes thereby maintaining the level of said chrominance signal constant, and means applying said reference voltage to said feedback control means to nullify the correcting voltage developed by said feedback control means in response to the change in said chrominance signal level occasioned by said adjusting means, such that said chrominance signal level is maintained constant by said feedback control means except for level changes occasioned by said adjusting means.

2. The invention set forth in claim 1 wherein said feedback control means includes amplifier means responsive to level changes in the signal applied thereto, said reference voltage being applied to said amplifier means to adjust the gain thereof such that said amplifier means are rendered nonresponsive to signal level changes occasioned by said adjusting means.

3. The invention said forth in claim 1 wherein said reference voltage is a DC voltage, the level of which varies with adjustment of the chrominance signal level by said adjusting means, and said feedback control means include amplifier means, said DC voltage being applied to said amplifier means to adjusts the bias voltage for said amplifier means to offset changes in level of the voltage applied to said amplifier means occasioned by adjustment of said adjusting means.

4. The invention set forth in claim 1 wherein said adjusting means comprises amplifying means responsive to the composite video signal of said television receiver to generate a luminance output signal, a chrominance output signal and said reference voltage, said amplifying means including control means to simultaneously adjust the chrominance and luminance signal levels and the level of said reference voltage.

said amplifying means providing differential gain between said chrominance and luminance outputs of constant ratio over the adjustment range of said control means.

5. The invention set forth in claim 4 wherein said amplifying means comprise a transistor having its base terminal coupled to receive the composite video signal, a first terminal for outputting said luminance signal and a second terminal for outputting said chrominance signal, said amplifying means including impedance means it circuit with said fist and second terminals, said impedance means including said control means, means for deriving said reference voltage and means to determine the ratio between said luminance and chrominance signal levels.

6. The invention as recited in claim 2 wherein said feedback control means includes an automatic gain control circuit responsive to the color burst level of said chrominance signal to maintain said chrominance signal level constant, said automatic gain control circuit including a chrominance subcarrier generator containing said amplifier means, said amplifier means being reponsive to said color burst signal and including impedance means to control the AC gain thereof, said impedance means being calibrated to respond to said DC reference voltage such that a change in color burst level caused by said adjusting means is nullified by an appropriate change in the gain of said amplifier means.

7. The invention recited in claim 3 wherein said feedback control means include first and second automatic gain control circuits, each containing amplifier means, the first automatic gain control circuit being responsive to the color burst level of said chrominance signal to maintain said chrominance signal level constant, and the second automatic gain control circuit being responsive to the average chrominance signal level to attenuate excursions therein, said DC voltage being applied to the amplifier means of each automatic gain control circuit to adjust the bias voltage thereof during adjustment of said video level adjusting means to offset level change in the voltage applied to each amplifier means caused by said adjusting means.

* * * * *